May 27, 1952
O. GROSVENOR
2,597,930
CONVEYER APPARATUS
Filed March 9, 1946
3 Sheets-Sheet 1
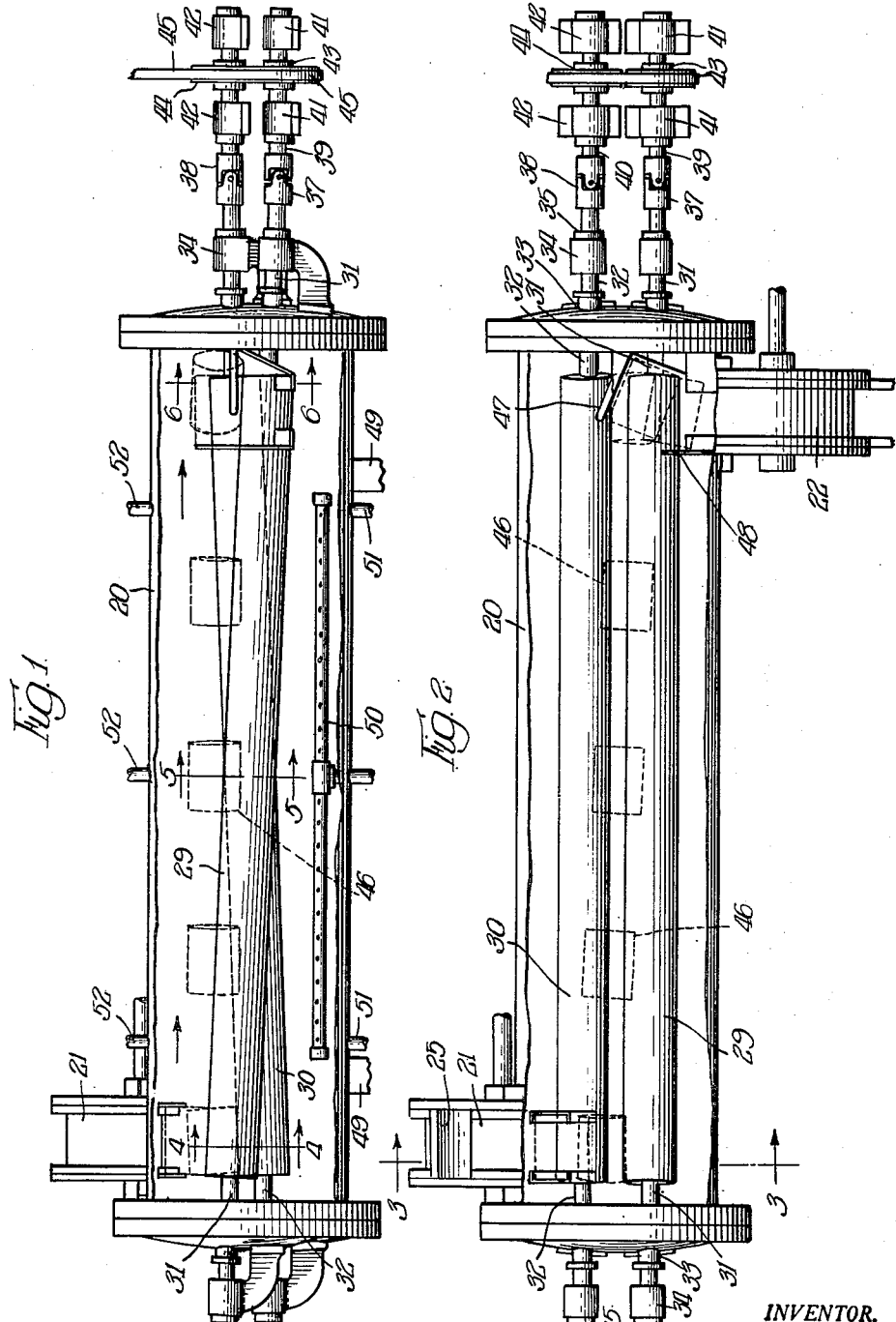
INVENTOR.
Oliver Grosvenor,
BY May 27, 1952  O. GROSVENOR  2,597,930
CONVEYER APPARATUS
Filed March 9, 1946  3 Sheets-Sheet 2
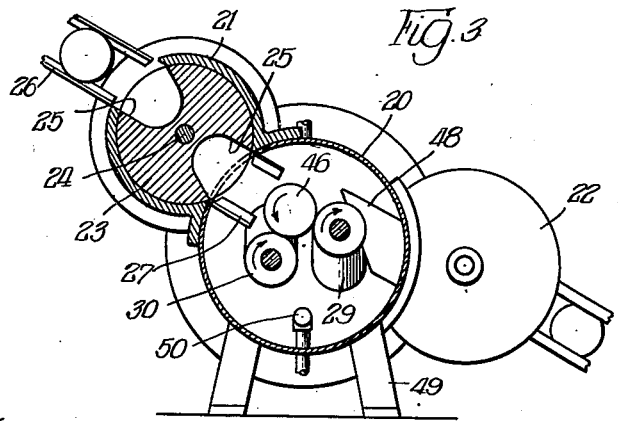
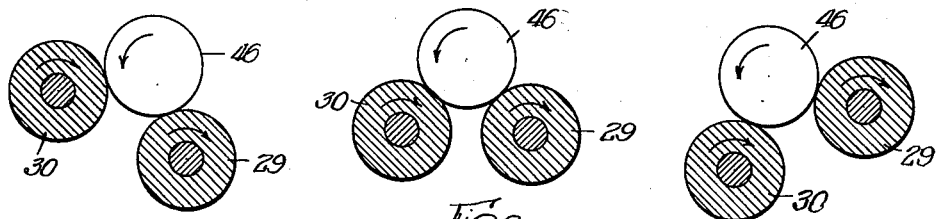
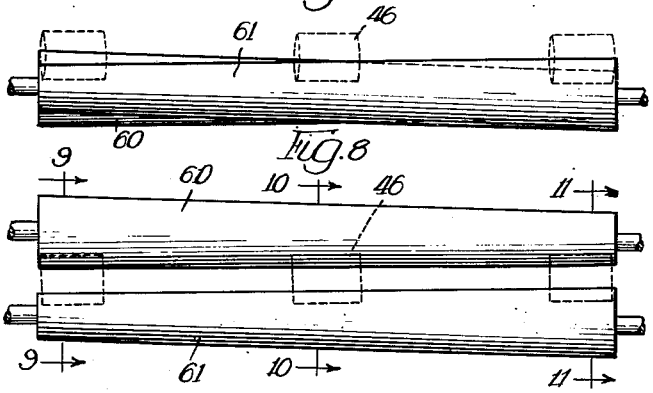
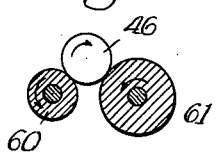 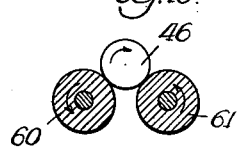 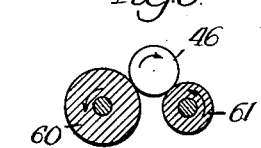
INVENTOR.
Oliver Grosvenor,
BY May 27, 1952 — O. GROSVENOR — 2,597,930
CONVEYER APPARATUS
Filed March 9, 1946 — 3 Sheets-Sheet 3
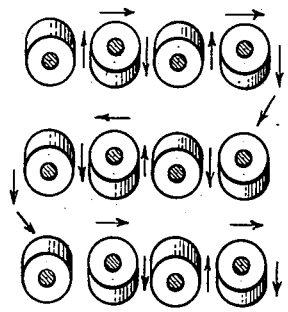
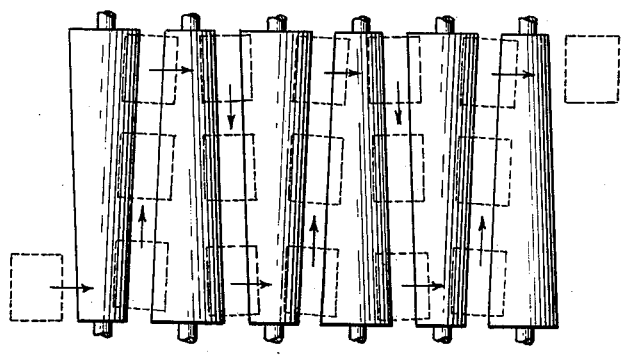
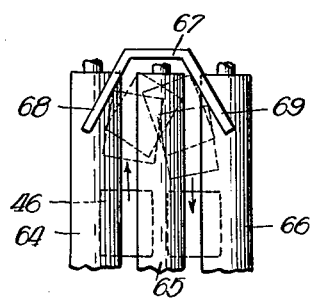
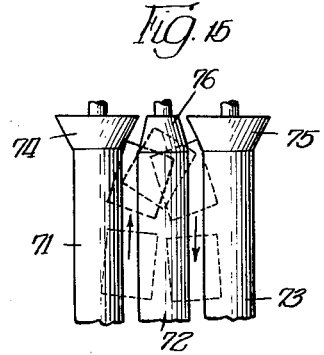
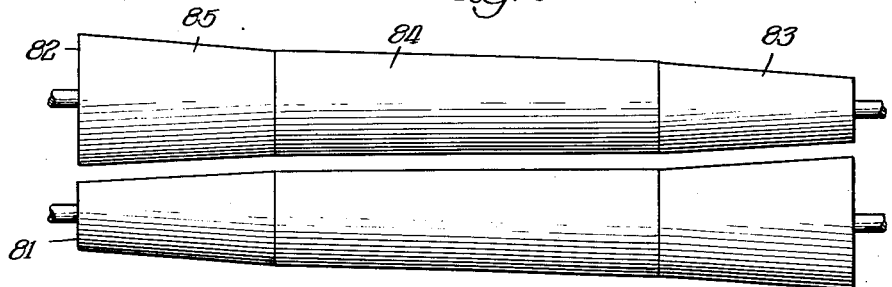
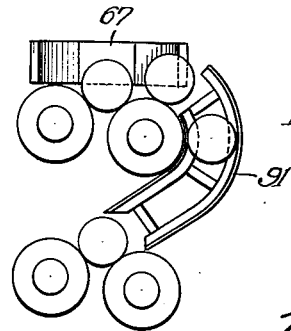
INVENTOR.
Oliver Grosvenor,
BY Patented May 27, 1952

2,597,930

UNITED STATES PATENT OFFICE 2,597,930

CONVEYER APPARATUS

Oliver Grosvenor Morrison, Ill., assignor to Libby, McNeill & Libby, Chicago, Ill., a corporation of Maine Application March 9, 1946, Serial No. 653,286

7 Claims. (Cl. 198—127)

This invention relates to a new and improved conveyor apparatus, and more particularly to a roll conveyor adapted to impart translational movement to objects or containers placed thereon. The apparatus is also adapted to give a rotational movement to objects placed thereon when such objects are suitably shaped for such movement.

Roll conveyors of types heretofore used have comprised rolls which are cylindrical in form and adjacently placed with their axes substantially parallel. Translational movement has been imparted to objects placed thereon either by slanting the rolls downwardly toward the discharge end or by additional mechanical means engaging the objects.

In the conveyor of the present invention, the objects conveyed may be delivered at the same level as they are received and no additional means for moving the objects are required.

The conveyor of the present invention is adapted for a wide variety of uses. It may be used to convey irregular objects or cylindrical objects such as food containers. In the case of irregular objects, the conveyor may impart only a translational movement or there may be some rotary movement. With substantially spherical or cylindrical objects, there is a definite and controlled rotary movement as well as a translational movement.

In addition to serving as a conveyor, the present construction may be used to size objects and drop them between the rolls since the clearance between rolls is varied gradually in certain forms of construction shown and may be varied in other forms as desired. Another use of the construction is for unscrambling and aligning elongated or cylindrical objects deposited on the conveyor in mixed positions.

While my invention has a wide range of uses, it has been found to be of particular utility as a conveyor in connection with heat treatment processes where it is capable of rotating and translating objects such as generally cylindrical cans or other containers so as to effect rapid heat transfer to or from such objects or the contents thereof.

In the processing of a number of food products, it is important to heat or cool them or give them successive treatments at different temperatures while in sealed containers. Modern research has developed that to properly preserve many food products and retain their various constituents in effective form for use, it is important that heat stages of treatment be accurately controlled as to time and temperature and that the entire contents of the container receives uniform treatment.

In the heat treatment of liquid or semi-liquid foods, or of foods which consist of discrete particles suspended in or surrounded by a liquid, it is well known that the transfer of heat to or from the food material is greatly accelerated by revolving the containers. Forms of apparatus to accomplish this rotation have been suggested and some are now in use. These are generally of two types, one in which the containers pass continuously through the apparatus while rotating at a relatively low speed, and the other in which the rotation is rapid but which operates on the intermittent or batch principle. The conveyor of the present invention combines the advantages of both types, including rapid rotation and continuous operation.

It is an object of the present invention to provide a new and improved conveyor construction.

It is also an object to provide a conveyor including rotating rolls and adapted for use in rotating, conveying, aligning or sorting materials, units or containers or for simultaneously carrying out a plurality of such operations.

It is an additional object of the present invention to provide a conveyor adapted for use in an apparatus for the transfer of heat to and from material in sealed containers.

It is further an object to provide apparatus of this character in which the containers may be rotated about their longitudinal axes and simultaneously given a longitudinal movement.

It is another object to provide apparatus for this purpose in which both the rotational and translational movements of units or containers are accomplished by the action of revolving rolls without the use of auxiliary moving conveying means.

It is also an object to provide a construction in which both the speed of rotation and the longitudinal movement of the containers may be controlled within wide limits.

It is an additional object to provide apparatus which is simple in design and construction and adapted for commercial production and use.

Other and further objects will appear as the description proceeds.

I have shown certain preferred embodiments of my invention in the accompanying drawings in which:

Figure 1 is a side elevation, partially in section, showing one form of my conveyor used in heat treatment apparatus;

Figure 2 is a plan view, partially in section, of the apparatus of Figure 1.

Figure 3 is a section taken on line 3—3 of Figure 2;

Figures 4, 5 and 6 are fragmentary sections taken on lines 4—4, 5—5 and 6—6 of Figure 1, illustrating the progress and positions of a container passing through the apparatus;

Figure 7 is a side elevation of a modified roll design;

Figure 8 is a plan view of the construction of Figure 7;

Figures 9, 10 and 11 are sections taken on lines 9—9, 10—10 and 11—11 of Figure 8;

Figure 12 is a diagrammatic end view of a multiple roll unit, using rolls of the type shown in Figure 1;

Figure 13 is a diagrammatic plan view of a multiple roll unit, using the type of rolls shown in Figures 7 and 8;

Figure 14 is a fragmentary plan view showing a construction for transferring containers laterally between roll troughs;

Figure 15 is a view similar to Figure 14, showing a modified form of construction;

Figure 16 is a plan view of a modified form of roll; and

Figure 17 is a diagrammatic elevation showing means for guiding conveyed material from one row of rolls to a lower row.

Referring first to the form of construction of Figures 1 to 6, inclusive, the conveyor is shown in connection with the closed drum or autoclave 20 which is provided with the rotary valve 21 for the introduction of cans or other generally cylindrical containers and with a similar valve 22 by means of which the cans are discharged from the chamber. The valve 21 comprises the rotating member 23 carried on shaft 24 which may be driven in any desired manner. This member 23 is provided with the can receiving pockets 25, adapted to receive cans from chute 26 and deliver them to chute 27 inside the autoclave.

The conveyor construction of Figures 1 to 6 inclusive is provided with a pair of cylindrical rollers 29 and 30 carried on shafts 31 and 32. These rollers are located in parallel vertical planes but in different intersecting planes making relatively small angles with the horizontal as clearly shown in Figure 1. The shafts 31 and 32 pass through stuffing boxes 33 in each end of the autoclave 20 and are supported in similar bearing brackets 34. The shafts are constrained against endwise movement by the shaft collars 35 on opposite ends of the bearings 34. The shafts 31 and 32 are connected by universal joints 37 and 38 to parallel extensions 39 and 40, journaled in pillow block bearings 41 and 42 and are driven through pulleys 43 and 44 in any desired manner, as by a V belt 45.

Cans or other cylindrical containers 46 have been shown in broken lines at different points in the path of travel along the trough between the two rolls. The relationship of the can and rolls is clearly shown in diagrammatic section in Figures 4, 5 and 6. Near the end of the path of travel the can 46 engages a transfer guide 47 which directs it into guides 48 which send it into a pocket in discharge valve 22. The autoclave 20 is shown supported on legs 49. The autoclave 20 has the perforated pipe 50 in its lower portion, through which pipe heating or cooling gases or liquids may be discharged into the chamber. Condensate or other liquids or gases may be withdrawn from the chamber through drains 51. Pipe connections 52 are also provided at the upper portion of the autoclave 20 and these may be used for venting the autoclave, supplying air, water or gas under pressure or for attaching auxiliary instruments such as a pressure gauge, a thermometer or a safety valve.

A conveyor comprising modified roll construction is shown in Figures 7 to 11 inclusive. Here the rolls 60 and 61 are tapered and reversely placed with the small end of one roll opposite the large end of the other roll. The axes of the two rolls are parallel but with the rolls rotating as shown in Figures 9 to 11, the cans 46 will travel from left to right of Figures 7 and 8 due to the taper.

Figure 12 shows a multiple roll assembly in three banks with rolls of the character shown in Figures 1 to 6 inclusive. The directions of rotation of the rolls and of travel of the cans are indicated by the arrows. Arrows pointing up indicate travel, resting on the adjacent rolls, away from the end of the rolls shown in the drawing and arrows pointing down indicate travel back toward that end. The cans travel in each trough between rolls and suitable transfer guides such as those shown in Figures 2 and 14 may be provided for lateral movement of the cans. Transfer downwardly from one bank of rolls to the next lower bank can be accomplished by means of chutes such as 91 in Figure 17, transfer guides directing the cans to the chutes. A multiple roll stand of this character permits a long travel and relatively long period of heat transfer in a comparatively short autoclave, while providing a large capacity for cans to be treated.

Figure 13 shows a multiple layout of rolls similar to those shown in Figures 7 to 10 with cans travelling in each trough, the route of travel being indicated by arrows.

Figure 14 shows one form of apparatus for transferring cans from the trough formed by the first and second rolls to that formed between the second and third rolls. The drawing shows three rolls 64, 65 and 66 and a deflecting guide 67 having arms 68 and 69. When the can 46 in its travel strikes the left arm 68 of the guide 67 its leading end is deflected at an angle to the right as shown in broken lines in the drawing. Consequently the friction between the cylindrical surface of the can 46 and of the second roll 65 is sufficient to cause the can 46 to be carried over this roll 65 and into the trough between rolls 65 and 66. As it rolls into this trough, its leading end strikes the arm 69 of guide 67 which positions it momentarily at an angle and accelerates its longitudinal progress in the trough between rolls 65 and 66.

In Figure 15 are shown rolls 71, 72 and 73, of which rolls 71 and 73 have an increasing taper to form enlarged conical ends 74 and 75, while the roll 72 has a reduced tapered end 76. The enlarged ends 74 and 75 function in the same manner as the guide arms of Figure 14. The reduced taper 76 of roll 72 has no operating function but is merely necessary to provide room for the enlarged ends 74 and 75.

In Figure 16, a pair of rolls 81 and 82 are shown which have varying taper at different portions of their length. The rolls are identical but reversely placed and each has a smaller end 83 of moderate taper, an intermediate portion 84 of more gradual taper and an end portion 85 of taper similar to the other end 83. It will be apparent that rolls may be made of differing taper at a number of sections if desired. This construction serves to change the angle between the can and the rolling surface and thus change the rate of longitudinal progress of the cans which may be desirable, especially when a single set of rolls passes cans through zones where different temperatures or other treatments are applied.

In operation, admission valve 21 and discharge valve 22 revolve at the same speed so that the desired number of containers are admitted to and discharged from the autoclave 20 in a unit time. The rate of rotation of the cans 46 depends upon the angular velocity of the rolls. The longitudinal travel of the container is a function of the roll surface speed and the degree of roll offset or the angle between the vertical projections of the roll axes. With tapered rolls, the axes are parallel and the degree of taper governs longitudinal travel. The greater the offset or the greater the angle of taper the greater distance the can will travel in one revolution. Increasing the speed of the rolls naturally increases the longitudinal travel of the can in a given time. Thus by changing the roll offset or taper of the rolls, and varying the roll speed, any desired combination of angular velocity and longitudinal translation of the can may be obtained.

The treatment in the autoclave may be applied at, above or below atmospheric pressure. A simple enclosure with removable covers may be substituted for the autoclave, when operation at atmospheric pressure only is desired. Any fluid or fluids suitable for the purpose may be used for heating or cooling. Applied to canned foods, the contents of the container may be heated to a sterilization temperature or may be frozen. In applications where high or low temperatures are utilized this apparatus has the great advantage that all bearings may be located outside of the machine where they will not be exposed to extremes of heat or cold. The elimination of auxiliary conveying means such as those of the screw, drag or intermittent type avoids certain operation and maintenance problems.

In the construction shown, the containers never travel in a straight line though such a path is approached when the roll offset or taper is small. This assumes that the roll surfaces are true cylinders or cones as by the use of rolls of varying or irregular cross-section the can may be made to follow a path which may be a straight line or an exaggerated curve.

It is generally desirable to rotate the can at a speed of not less than 50 R. P. M. and this may be increased to as high as 1500 R. P. M. Practicable rates of longitudinal travel vary from four inches to one-thirtieth inch per can revolution.

The roll surfaces may be finished smooth, though it may be desirable in certain cases to leave lathe tool marks on the roll surface to increase friction between the rolls and cans.

The use of the conveyor has been largely described in connection with heat treatment of food products in cylindrical cans, but it will be apparent that this is only one of many uses for which my improved conveyor is adapted.

While I have shown certain preferred embodiments of my invention, these are to be understood to be illustrative only as it is capable of changes to meet differing conditions and requirements and I contemplate such modifications as come within the spirit and scope of the appended claims.

I claim:

1. Conveyor apparatus comprising a pair of adjacent rolls spaced to support an object resting by gravity in the trough between the pair, said rolls having non-parallel axes, the roll surfaces varying in their relationship to each other at successive transverse planes, means for rotating the rolls in the same direction whereby objects placed in the trough between the rolls are given a longitudinal but non-rectilinear movement.

2. Conveyor apparatus comprising a pair of adjacent cylindrical rolls spaced to support an object resting by gravity in the trough between the pair, said rolls having non-parallel axes, the axis of one roll being lower at one end than the axis of the adjacent roll at that end, means for rotating the rolls in the same direction whereby objects placed in the trough between the rolls are rotated and given a longitudinal but non-rectilinear movement.

3. Conveyor apparatus comprising a pair of adjacent rolls, said rolls having non-parallel axes, the rolls being located adjacent each other to provide a trough to support by gravity an object placed in the trough, and means for rotating the rolls in the same direction whereby objects placed in the trough between the rolls are moved through a path non-parallel to the axis of either roll.

4. Conveyor apparatus comprising at least a pair of adjacent rolls forming a trough therebetween adapted to support objects held therein by gravity, said rolls having non-parallel axes, the axis of one roll being located at one end below the axis of the adjacent roll and at the opposite end above the axis of the adjacent roll.

5. Conveyor apparatus comprising at least a pair of adjacent rolls forming a trough therebetween adapted to support objects held therein by gravity, said rolls having non-parallel axes, the axes appearing parallel in plan view and non-parallel and crossing in an elevational view.

6. Conveyor apparatus comprising at least a pair of adjacent rolls, the rolls forming a trough between each pair adapted to support and move objects resting on both rolls of the pair, each roll being mounted to rotate about its axis, means for rotating the rolls, the line constituting the upper surface of each roll forming a vertical acute angle at its intersection with a horizontal plane, the opposite ends of each roll element being higher and lower than the adjacent ends of the upper surface of the adjacent roll in alternate arrangement, and the rolls being so formed and related as to impart a longitudinal but non-rectilinear movement to objects resting therebetween and to rotate said objects.

7. Conveyor apparatus comprising at least a pair of adjacent rolls, the rolls forming a trough between each pair adapted to support and move objects resting on both rolls of the pair, each roll being mounted to rotate about its axis, means for rotating the rolls, the line constituting the upper surface of each roll forming a vertical acute angle at its intersection with a horizontal plane, the opposite ends of each roll element being higher and lower than the adjacent ends of the upper surface of the adjacent roll in alternate arrangement, the rolls being so formed and related as to impart a longitudinal but non-rectilinear movement to objects resting therebetween and to rotate said objects and means for changing the angular relation between an object and the rolls to guide the object out of a trough and over an adjacent roll.

OLIVER GROSVENOR.

REFERENCES CITED

The following references are of record in the file of this patent:

UNITED STATES PATENTS

| Number | Name | Date |
|---|---|---|
| 305,142 | Burckhardt | Sept. 16, 1884 |
| 440,677 | Williams | Nov. 18, 1890 |
| 1,176,228 | McIntosh | Mar. 21, 1916 |
| 1,277,387 | Cloud | Sept. 3, 1918 |
| 1,516,016 | Kallenbach | Nov. 18, 1924 |
| 1,652,419 | Shields | Dec. 13, 1927 |
| 1,795,137 | Nye | Mar. 3, 1931 |
| 1,811,991 | Bates | June 30, 1931 |
| 1,887,434 | Sammis | Nov. 8, 1932 |
| 2,099,222 | Paxton | Nov. 16, 1937 |
| 2,099,226 | Paxton | Nov. 16, 1937 |
| 2,267,429 | Stebler | Dec. 23, 1941 |
| 2,423,629 | Vogeli | July 8, 1947 |